(12) United States Patent
Sugimoto et al.

(10) Patent No.: US 11,951,903 B2
(45) Date of Patent: Apr. 9, 2024

(54) DRIVING ASSISTANCE SYSTEM

(71) Applicant: KOITO MANUFACTURING CO., LTD., Tokyo (JP)

(72) Inventors: Atsushi Sugimoto, Shizuoka (JP); Naoki Tatara, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 194 days.

(21) Appl. No.: 17/519,830

(22) Filed: Nov. 5, 2021

(65) Prior Publication Data
US 2022/0055531 A1 Feb. 24, 2022

Related U.S. Application Data

(63) Continuation of application No. PCT/JP2020/018428, filed on May 1, 2020.

(30) Foreign Application Priority Data

May 9, 2019 (JP) .................. 2019-089004

(51) Int. Cl.
*B60Q 1/52* (2006.01)
*G06V 20/58* (2022.01)
*G08G 1/16* (2006.01)

(52) U.S. Cl.
CPC ............. *B60Q 1/52* (2013.01); *G06V 20/58* (2022.01); *G08G 1/16* (2013.01); *B60Q 2400/50* (2013.01)

(58) Field of Classification Search
CPC ....................................................... B60Q 1/52
See application file for complete search history.

(56) References Cited

U.S. PATENT DOCUMENTS

| | | | |
|---|---|---|---|
| 11,267,394 B2* | 3/2022 | Oikawa | G05D 1/0236 |
| 2014/0085476 A1* | 3/2014 | Toyofuku | B60Q 1/085 |
| | | | 348/148 |
| 2017/0337821 A1* | 11/2017 | Masuda | H04N 9/3185 |

(Continued)

FOREIGN PATENT DOCUMENTS

| | | |
|---|---|---|
| CN | 105976641 A | 9/2016 |
| CN | 108128243 A | 6/2018 |
| CN | 109311480 A | 2/2019 |

(Continued)

OTHER PUBLICATIONS

International Search Report (PCT/ISA/210) and Written Opinion (PCT/ISA/237) dated Jul. 7, 2020, by the Japan Patent Office as the International Searching Authority for International Application No. PCT/JP2020/018428.

(Continued)

*Primary Examiner* — Travis R Hunnings
(74) *Attorney, Agent, or Firm* — BUCHANAN INGERSOLL & ROONEY PC

(57) ABSTRACT

A driving assistance system includes an illumination apparatus and a controller. The illumination apparatus is configured to draw an avoidance pattern PTN on a road surface such that it indicates a lane in which the driver's vehicle is to travel or a direction in which the driver's vehicle is to travel. Upon detecting, by a sensor or communication, an obstacle in front of the driver's vehicle, the controller instructs the illumination apparatus to draw the avoidance pattern PTN.

7 Claims, 6 Drawing Sheets

(56) References Cited

U.S. PATENT DOCUMENTS

2018/0157038 A1    6/2018  Kabe
2019/0160996 A1*   5/2019  Nishio .................. F21S 41/675

FOREIGN PATENT DOCUMENTS

| JP | 2009298360 A | 12/2009 |
| JP | 2014153868 A | 8/2014 |
| JP | 2015033954 A | 2/2015 |
| JP | 2015164828 A | 9/2015 |
| JP | 2016030527 A | 3/2016 |
| JP | 2017033542 A | 2/2017 |
| JP | 2017134876 A | 8/2017 |
| JP | 2019059245 A | 4/2019 |
| KR | 20170082761 A | 7/2017 |
| WO | 2009074671 A1 | 6/2009 |
| WO | 2017119557 A1 | 7/2017 |
| WO | 2017134876 A1 | 8/2017 |
| WO | 2019082980 A1 | 5/2019 |

OTHER PUBLICATIONS

Office Action (Notice of Reasons for Refusal) dated Aug. 1, 2023, in corresponding Japanese Patent Application No. 2021-518386 and English translation of the Office Action. (5 pages).

Office Action (Notification of the First Office Action) issued on Oct. 12, 2023, in corresponding Chinese Patent Application No. 202080034552.8 and English translation of the Office Action. (19 pages).

* cited by examiner

PTN

PTN

PTN

404

PTN

DRIVING ASSISTANCE SYSTEM

BACKGROUND

1. Technical Field

The present disclosure relates to a driving assistance system.

2. Description of the Related Art

Progress is being made in making automotive lamps more sophisticated. As an example, a lamp that irradiates a light beam pattern to the road surface so as to draw figures or characters has been proposed.

SUMMARY

The present disclosure has been made in view of such a situation.

An embodiment of the present disclosure relates to a driving assistance system. The driving assistance system includes: an illumination apparatus structured to draw a pattern which is visible to a driver on a road surface such that it indicates a lane in which the driver's vehicle is to travel or a direction in which the driver's vehicle is to travel in a manner in which the pattern is visible to a driver; and a controller structured to instruct the illumination apparatus to draw the pattern upon detecting, by means of a sensor or communication, an obstacle in front of the driver's vehicle.

It should be noted that any combination of the components described above or any manifestation thereof may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Outline of Embodiments

Figure 1:
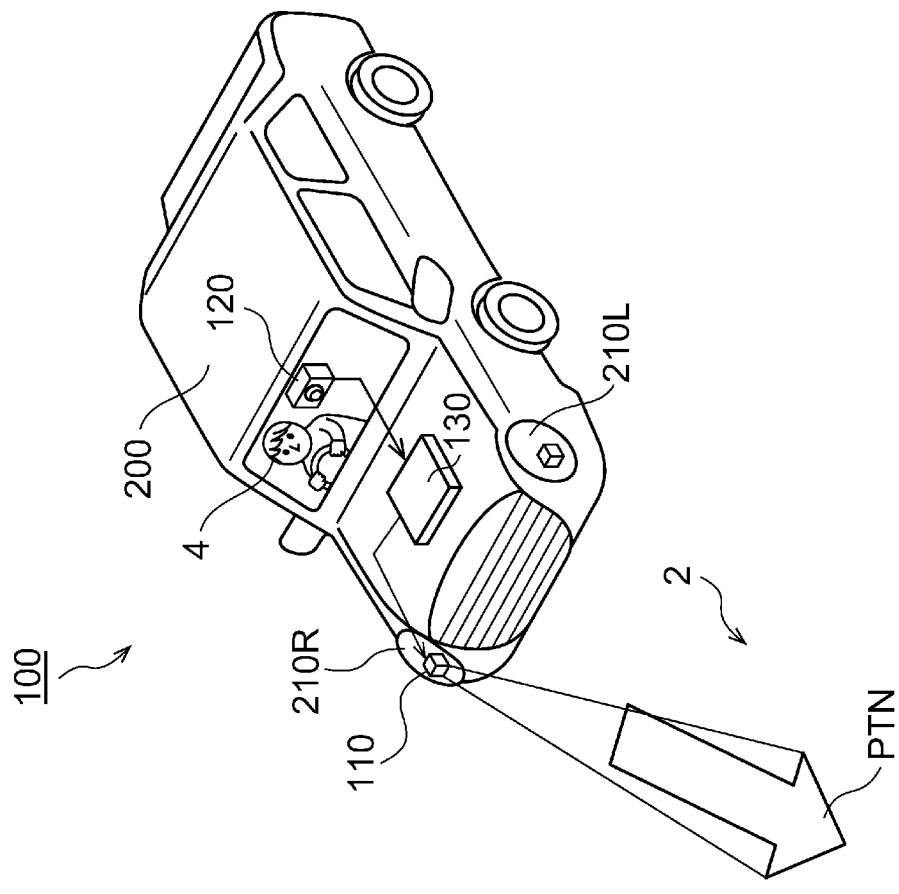
FIG. 1 is a block diagram showing a driving assistance system according to an embodiment 1.
Figure 1:
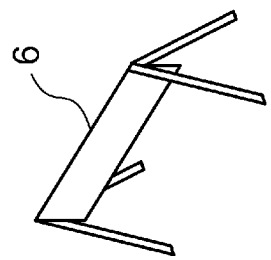

An outline of several example embodiments of the disclosure follows. This outline is provided for the convenience of the reader to provide a basic understanding of such embodiments and does not wholly define the breadth of the disclosure. This outline is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

One embodiment disclosed in the present specification relates to a driving assistance system. The driving assistance system includes an illumination apparatus and a controller. The illumination apparatus is structured to draw a pattern which is visible to a driver on a road surface such that it indicates a lane in which the driver's vehicle is to travel or a direction in which the driver's vehicle is to travel. The controller is structured to instruct the illumination apparatus to draw the pattern upon detecting, by means of a sensor or communication, an obstacle in front of the driver's vehicle.

In one embodiment, the controller may instruct the illumination apparatus to draw the pattern on a near side of a point at a stopping distance to the obstacle. With this, even if the driver is not able to perform a steering operation so as to turn in the suggested direction indicated by the pattern, this allows the vehicle to stop the vehicle before the obstacle.

In one embodiment, when the distance between the driver's vehicle and the obstacle becomes smaller than the stopping distance, the controller may notify the driver of this information. This allows the driver to be prompted to start a braking operation or a steering operation.

In one embodiment, the controller may adjust a drawing timing of the pattern according to a surrounding situation.

In one embodiment, the controller may be structured to detect an overtaking vehicle approaching from behind the driver's vehicle. Also, upon detecting the overtaking vehicle, after completion of overtaking, the controller may issue an instruction to draw the pattern. This allows the driver's vehicle to be prevented from pulling in front of the overtaking vehicle, and from interfering with the passage of the overtaking vehicle.

In one embodiment, the controller may be structured to detect an overtaking vehicle approaching from behind the driver's vehicle. Also, upon detecting the overtaking vehicle, the pattern may indicate the existence of the overtaking vehicle in addition to the traveling direction of the driver's vehicle. This allows the driver to be notified of the existence of the overtaking vehicle. This allows the prevention of an interruption having the potential to cause emergency braking.

Embodiments

Description will be made below regarding preferred embodiments with reference to the drawings. The embodiments have been described for exemplary purposes only, and are by no means intended to restrict the present invention. Also, it is not necessarily essential for the present invention that all the features or a combination thereof be provided as described in the embodiments. In each drawing, the same or similar components, members, and processes are denoted by the same reference numerals, and redundant description thereof will be omitted as appropriate.

Embodiment 1

FIG. 1 is a block diagram showing a driving assistance system 100 according to an embodiment 1. The driving assistance system 100 is mounted on a vehicle 200. The driving assistance system 100 includes an illumination apparatus 110, a sensor 120, and a controller 130.

The illumination apparatus 110 is configured to draw a pattern PTN (which will be referred to as an "avoidance pattern" hereafter) that indicates the direction in which a driver's vehicle 200 is to travel in order to avoid an obstacle 6 in front of the driver's vehicle 200 on a road surface 2 in a manner in which the avoidance pattern PTN is visible to a driver 4. The obstacle 6 is an irregular object, examples of which include barricades, signboards, illumination lighting, cones, etc., indicating road closure, road construction, a disabled vehicle, or the like.

Such an arrangement requires at least two kinds of avoidance patterns, i.e., an avoidance pattern in which the vehicle is to turn to the right and an avoidance pattern in which the vehicle is to turn to the left. In order to allow the avoidance pattern to be switched between these two kinds of patterns, the illumination apparatus 110 may be configured as a combination of a light source and a patterning device that patterns the strength distribution of emitted light from the light source. Examples of such a patterning device include a Digital Micromirror Device (DMD), liquid crystal device, etc. With this, the illumination apparatus 110 can also be used to draw a pattern other than the avoidance pattern.

Alternatively, the avoidance pattern to be drawn when the vehicle is to turn to the right and the avoidance pattern to be drawn when the vehicle is to turn to the left may be drawn by respective dedicated illumination apparatuses.

The illumination apparatus 110 may be built into a headlamp 210. The illumination apparatus 110 may include two light sources respectively built into left and right headlamps 210. Also, the avoidance patterns PTN may be formed by means of two beams generated by the two light sources.

The sensor 120 senses a region in front of the vehicle. The kind of the sensor 120 is not restricted in particular. Examples of the sensor 120 include monocular cameras, compound eye cameras, infrared cameras, Time of Flight (TOF) sensors, LiDAR (Light Detection and Ranging, Laser Imaging Detection and Ranging), etc. As shown in FIG. 1, the sensor 120 may be arranged on the back side of a rear-view mirror, or may be arranged at a front grille or a front bumper. Alternatively, the sensor 120 may be housed in the headlamp 210 together with the illumination apparatus 110.

The controller 130 judges the presence or absence of an obstacle 6 in front of the driver's vehicle 200 based on the output IMG of the sensor 120. Upon detecting an obstacle 6, the controller 130 instructs the illumination apparatus 110 to draw the avoidance pattern PTN.

All the components of the driving assistance system 100 may be built into an automotive lamp such as the headlamp 210 or the like. An advanced automotive lamp such as a variable light distribution lamp (Adaptive Driving Beam: ADB) or the like includes a camera, processor, and so on as its built-in components. That is to say, such an advanced automotive lamp is provided with many hardware components required for the driving assistance system 100. In this case, by mounting the driving assistance system 100 in the headlamp 210, such an arrangement allows the hardware components to be used as a shared resource.

Figure 2C:
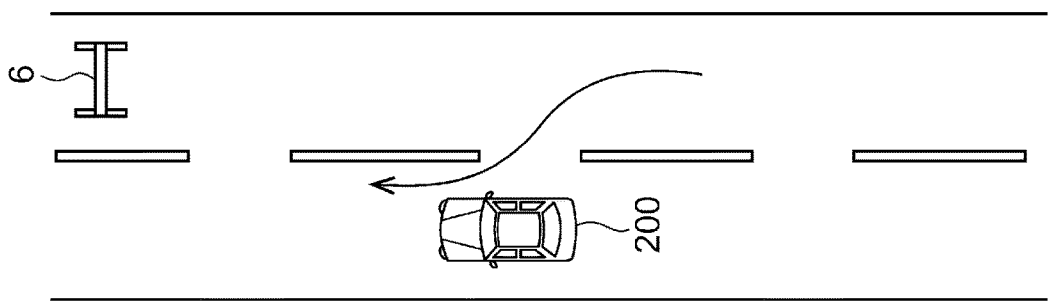
FIGS. 2A through 2C are diagrams for explaining the operation of the driving assistance system.
Figure 2B:
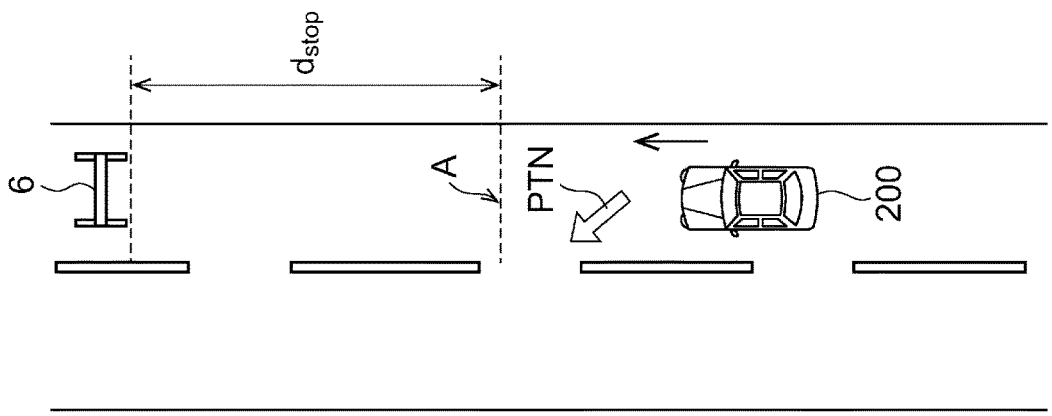
Figure 2A:
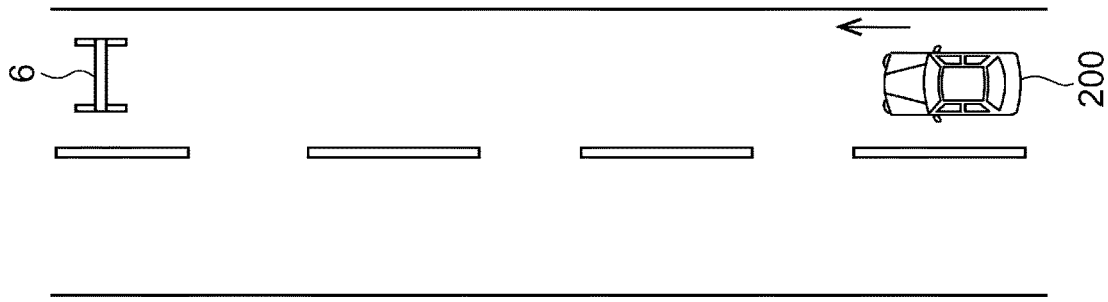

The above is the configuration of the driving assistance system 100. Next, description will be made regarding the operation thereof. FIGS. 2A through 2C are diagrams for explaining the operation of the driving assistance system 100. In the drawings, the vehicle 200 travels in the right lane of a two-lane side of a load. There is an obstacle 6 in front of the vehicle 200.

Upon detecting the obstacle 6 based on the output of the sensor 120, the controller 130 draws the avoidance pattern PTN on the road surface. In this situation, the vehicle is not able to turn to the right side in order to avoid the obstacle 6. Accordingly, the controller 130 draws the avoidance pattern PTN so as to prompt the driver to change lanes to the left lane. In addition to the drawing of the avoidance pattern PTN, the controller 130 may prompt the driver to change lanes in an audible manner.

When the driver recognizes the avoidance pattern PTN, the driver can turn the steering to the left. As a result, the vehicle 200 moves toward the left lane, thereby allowing the obstacle 6 to be avoided.

If there is an obstacle in the left lane when the vehicle travels in the left lane, an avoidance pattern is drawn so as to prompt the driver to change lanes to the right lane.

With the driving assistance system 100 according to the embodiment as described above, this allows the driver to be cautioned beforehand so as to secure room for driving operations, thereby supporting safe driving.

As shown in FIG. 2B, the controller 130 may preferably instruct the illumination apparatus 110 to draw a pattern on a near side of a point A at a stopping distance $d_{STOP}$ to the obstacle 6. With this, even if the driver is not able to steer the vehicle in a suggested direction indicated by the avoidance pattern PTN, this allows the vehicle to stop before the obstacle 6. The controller 130 calculates the stopping distance $d_{STOP}$ giving consideration to the vehicle speed, the slipperiness of the road surface, etc. Also, the controller 130 may change the timing at which the avoidance pattern PTN is to be drawn according to the stopping distance $d_{STOP}$ thus calculated.

The illumination apparatus 110 may change the avoidance pattern PTN according to the distance to the obstacle 6. For example, the illumination apparatus 110 may increase the intensity of light to be used for drawing the avoidance pattern PTN according to a decrease in the distance to the obstacle 6. Also, the illumination apparatus 110 may flash the avoidance pattern PTN as the vehicle becomes closer to the obstacle 6 so as to further caution the driver.

Also, when the driver's vehicle 200 becomes closer to the obstacle 6 than the stopping distance position, the controller 130 may notify the driver 4. The method for the notification is not restricted in particular. The notification may be made in a visual manner using a lamp or an instrument panel. Also, the notification may be made in a tactile manner using vibration or the like. This allows the driver to be prompted to start a braking operation or a steering operation.

Figure 3A:
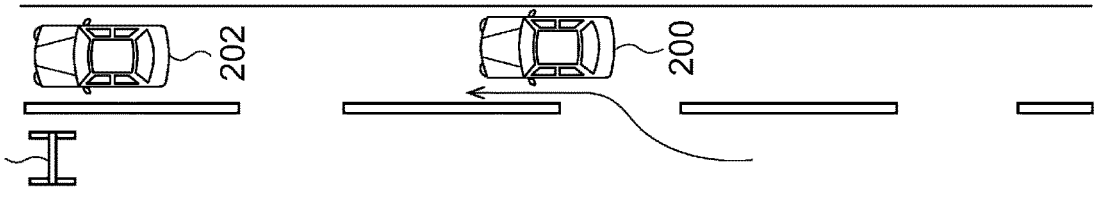
FIGS. 3A through 3D are diagrams for explaining the operation of the driving assistance system.
Figure 3B:
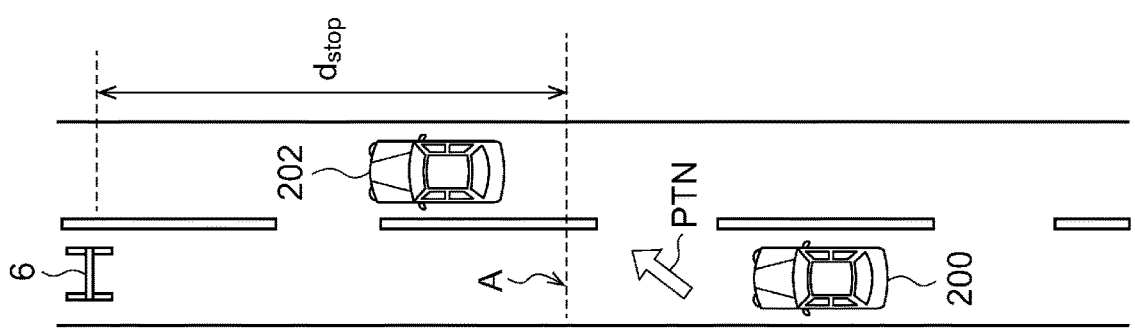
Figure 3C:
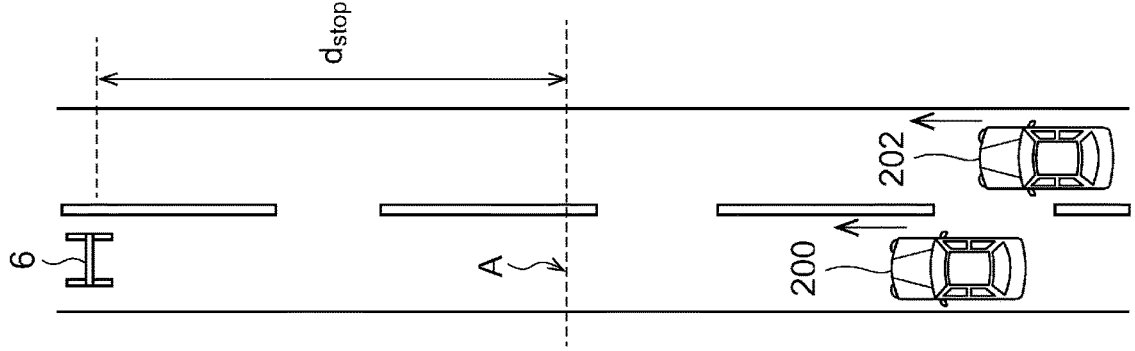
Figure 3D:
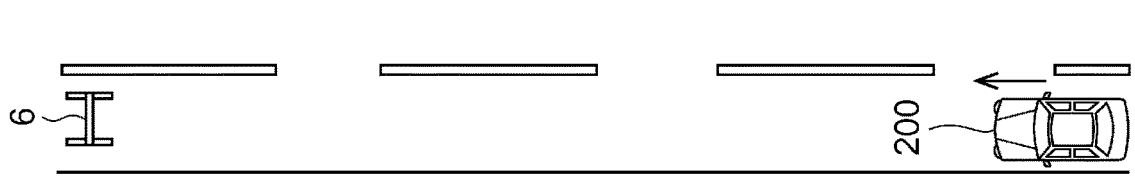

FIGS. 3A through 3D are diagrams for explaining the operation of the driving assistance system 100. The controller 130 adjusts the drawing timing of the avoidance pattern PTN according to the surrounding situation. In this example, as shown in FIG. 3A, the vehicle 200 travels in the left lane of a two-lane side of a load in the drawing. There is an obstacle 6 in front of the vehicle 200. As shown in FIG. 3B, there is an overtaking vehicle 202 approaching from behind the driver's vehicle 200 in the lane after changing lanes (right lane). In this case, in a case in which the avoidance pattern PTN is immediately drawn regardless of the existence of the overtaking vehicle 202, this leads to the driver's vehicle 200 pulling in front of the overtaking vehicle 202, which is an undesirable situation. In this case, as shown in FIG. 3C, the drawing stands by until the completion of the overtaking by the overtaking vehicle 202. That is to say, after the overtaking is completed, the avoidance pattern PTN is drawn.

The existence of the overtaking vehicle 202 and the completion of the overtaking by the overtaking vehicle 202 may be detected by a sensor mounted on the vehicle 200, by vehicle-to-vehicle communication, or by communication with the infrastructure.

Other kinds of conceivable examples of a situation in which the timing of the drawing of the avoidance pattern PTN is to be adjusted are as follows.

For example, when there is an obstacle 6 ahead of an intersection, changing lanes in the intersection is undesirable. In this case, the avoidance pattern PTN may be drawn after the completion of the passage of the driver's vehicle 200 through the intersection.

In some cases, changing lanes while maintaining the current vehicle speed is undesirable. In this case, the pattern drawing may stand by until the vehicle speed is raised or lowered to a preferable vehicle speed. That is to say, the avoidance pattern PTN may be drawn after the vehicle speed reaches the preferable vehicle speed.

Figure 4:
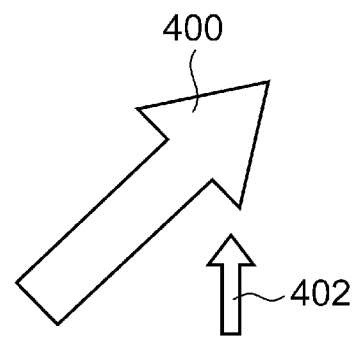
FIG. 4 is a diagram showing a modification of an avoidance pattern PTN.

FIG. 4 is a diagram showing a modification of the avoidance pattern PTN. As described above, the controller 130 may be configured to detect the overtaking vehicle 202 approaching behind the driver's vehicle. In this case, when the overtaking vehicle 202 is detected, an avoidance pattern PTN' may indicate the existence of the overtaking vehicle 202 in addition to indicating the traveling direction of the driver's vehicle. In this example, a large arrow-shaped mark 400 indicates the direction in which the driver's vehicle is to travel. On the other hand, a small arrow-shaped mark 402 indicates the existence of the overtaking vehicle 202. This allows the driver 4 to be notified of the existence of the overtaking vehicle 202. Accordingly, this allows the prevention of an interruption having the potential to cause emergency braking.

Embodiment 2

Figure 5:
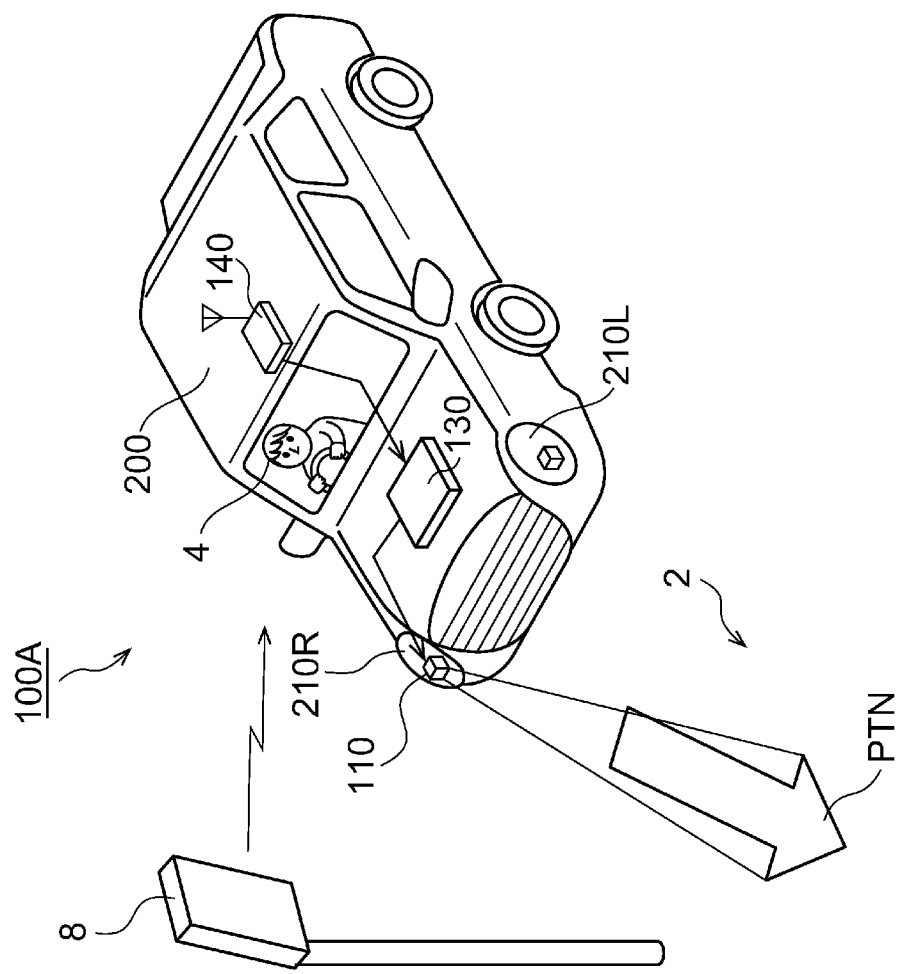
FIG. 5 is a driving assistance system according to an embodiment 2.

FIG. 5 is a diagram showing a driving assistance system 100A according to an embodiment 2. The driving assistance system 100A includes a wireless communication apparatus 140 in addition to or instead of the sensor 120. The wireless communication apparatus 140 acquires information that indicates the situation in the vicinity of the vehicle from the traffic infrastructure 8. This information includes information with respect to an obstacle 6 in front of the vehicle. The controller 130 detects the obstacle 6 based on the information acquired by the wireless communication apparatus 140, and draws the avoidance pattern PTN.

The wireless communication apparatus 140 may be configured to communicate with another wireless communication apparatus mounted on another vehicle in addition to or instead of the traffic infrastructure 8. Also, the wireless communication apparatus 140 may acquire information with respect to the obstacle 6 from another vehicle.

Description has been made above regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Modification 1

Figure 6A:
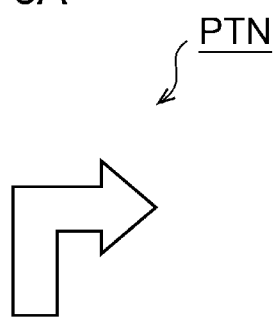
FIGS. 6A through 6D are diagrams each showing a modification of the avoidance pattern.
Figure 6B:
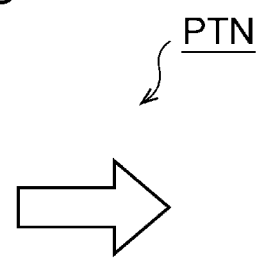
Figure 6C:
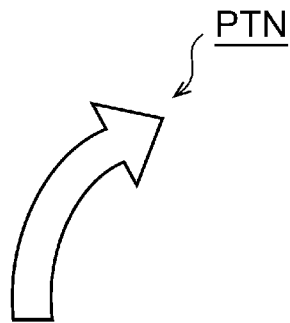
Figure 6D:
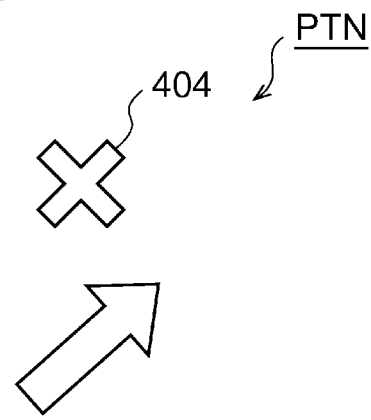

FIGS. 6A through 6D are diagrams each showing a modification of the avoidance pattern. As shown in FIGS. 6A through 6C, the arrow-shaped mark that indicates the suggested direction is not restricted to such an arrow-shaped mark that is oriented diagonally. Also, as shown in FIG. 6D, in addition to such an arrow-shaped mark, the avoidance pattern may include a mark 404 that indicates the existence of an obstacle in a visual manner.

Modification 2

The illumination apparatus 110 may be configured to draw other kinds of patterns on the road surface in addition to the avoidance pattern. In this case, after reading out a road sign or maximum legal speed information, the information thus read out may be drawn on the road surface by the illumination apparatus 110. Alternatively, the suggested traveling direction may be drawn on the road surface based on navigation information.

Modification 3

In a case in which a malfunction or abnormal state occurs in a traveling vehicle, such a vehicle has the potential to become an obstacle in the future. In order to solve such a problem, when a malfunction or an abnormal state has occurred in a vehicle, the vehicle may notify the following vehicles of this information by vehicle-to-vehicle communication. Upon receiving such a notice from a leading vehicle, each following vehicle may recognize the leading vehicle as an obstacle with the notice as a trigger, and may draw the avoidance pattern PTN on the road surface.

While the preferred embodiments of the present disclosure have been described using specific terms, such description is for illustrative purposes only, and it is to be understood that changes and variations may be made without departing from the spirit or scope of the appended claims.

What is claimed is:

1. A driving assistance system comprising:
   an illumination apparatus structured to draw a pattern which is visible to a driver on a road surface when an obstacle exists in front of the driver's vehicle, wherein the pattern indicates a lane in which the driver's vehicle is to travel in order to avoid the obstacle or a direction in which the driver's vehicle is to travel in order to avoid the obstacle; and
   a controller structured to instruct the illumination apparatus to draw the pattern upon detecting, by means of a sensor or communication, the obstacle in front of the driver's vehicle.

2. The driving assistance system according to claim 1, wherein the controller instructs the illumination apparatus to draw the pattern on a near side of a point at a stopping distance to the obstacle.

3. The driving assistance system according to claim 2, wherein, when a distance between the driver's vehicle and the obstacle becomes smaller than the stopping distance, the controller notifies the driver of this information.

4. The driving assistance system according to claim 1, wherein the controller adjusts a drawing timing of the pattern according to a surrounding situation.

5. The driving assistance system according to claim 4, wherein the controller is structured to detect an overtaking vehicle approaching from behind the driver's vehicle,
   and wherein, upon detecting the overtaking vehicle, after completion of overtaking, the controller issues an instruction to draw the pattern.

6. An automotive lamp provided with the driving assistance system according to claim 1.

7. A vehicle provided with the driving assistance system according to claim 1.

\* \* \* \* \*